United States Patent [19]
DeKoning

[11] Patent Number: 5,742,752
[45] Date of Patent: Apr. 21, 1998

[54] METHOD FOR PERFORMING A RAID STRIPE WRITE OPERATION USING A DRIVE XOR COMMAND SET

[75] Inventor: Rodney A. DeKoning, Wichita, Kans.

[73] Assignee: Symbios Logic Inc., Fort Collins, Colo.

[21] Appl. No.: 581,153

[22] Filed: Dec. 29, 1995

[51] Int. Cl.⁶ .............................. G06F 11/00; G06F 12/00
[52] U.S. Cl. ........................ 395/182.04; 395/441
[58] Field of Search .................... 395/182.03, 182.04, 395/182.05, 182.06, 427, 441, 438, 439; 371/51.1

[56] References Cited

U.S. PATENT DOCUMENTS

| | | | |
|---|---|---|---|
| 5,191,584 | 3/1993 | Anderson | 395/182.04 |
| 5,313,626 | 5/1994 | Jones et al. | 395/575 |
| 5,315,602 | 5/1994 | Noya et al. | 371/40.4 |
| 5,390,187 | 2/1995 | Stallmo | 371/10.1 |
| 5,506,977 | 4/1996 | Jones | 395/482 |
| 5,594,862 | 1/1997 | Winkler et al. | 395/182.03 |

*Primary Examiner*—Albert Decady
*Attorney, Agent, or Firm*—Daniel N. Fishman; Wayne P. Bailey

[57] ABSTRACT

Method for implementing a stripe write operation in a RAID device having XOR command set enabled disk drives on a common interface bus. The method of the present invention improves upon prior designs which do not use the XOR command set by eliminating the need for the RAID controller to include XOR (parity) generation computational elements. Further, the method of the present invention improves upon the stripe write method suggested by the XOR command set specifications in which a stripe is performed by a series of xdwrite XOR command operations issued to the data drives of the RAID array. Rather, the method of the present invention performs parallel standard writes of the data portions of the stripe write, then issues a rebuild XOR command to the parity disk drive to rapidly regenerate the parity blocks in the stripe just written. The method of the present invention reduces the worst case rotational latency delay of the stripe write operation to two rotational latency periods.

9 Claims, 4 Drawing Sheets

STRIPE WRITE WITHOUT XOR COMMAND SET

**STRIPE WRITE WITH
XOR COMMAND SET**

METHOD FOR PERFORMING A RAID STRIPE WRITE OPERATION USING A DRIVE XOR COMMAND SET

BACKGROUND OF THE INVENTION

1. Field of the Invention

The present invention relates to the control of a disk array storage subsystems and in particular to the implementation of a stripe write operation using the XOR command set of disk drives in the RAID device.

2. Background of the Invention

Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

A popular solution to these mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error codes, and so-called "hot spares" (extra storage modules that may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled *A Case for Redundant Arrays of Inexpensive Disks* (RAID), reviews the fundamental concepts of RAID technology.

RAID level zero, commonly referred to as disk striping, distributes data stored on a storage subsystem across a plurality of disk drives to permit parallel operation of a plurality of disk drives thereby improving the performance of I/O write requests to the storage subsystem. Though RAID level zero functionality improves I/O write operation performance, reliability of the disk array subsystem is decreased as compared with that of a single large disk drive. To improve reliability of disk arrays, other RAID geometries for data storage include generation and storage of redundancy information to permit continued operation of the disk array through certain common failure modes of the disk drives in the disk array.

Five "levels" of standard RAID geometries that include redundancy information are defined in the Patterson publication. The simplest array, a RAID level 1 system, comprises one or more disks for storing data and an equal number of additional "mirror" disks for storing copies of the information written to the data disks. The remaining RAID levels, identified as RAID levels 2, 3, 4 and 5 systems, segment the data into portions for storage across several data disks. One or more additional disks are utilized to store error check or parity information. The methods of the present invention may be useful in conjunction with any of the standard RAID levels including level 0.

RAID storage subsystems typically utilize a control module that shields the user or host system from the details of managing the redundant array. The controller makes the subsystem appear to the host computer as one (or more), highly reliable, high capacity disk drive. In fact, the RAID controller may distribute the host computer system supplied data across a plurality of the small independent drives with redundancy and error checking information so as to improve subsystem reliability. Frequently RAID subsystems provide large cache memory structures to improve the performance of the RAID subsystem further. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

RAID subsystems commonly define and control a plurality of RAID storage devices within a single subsystem. Each device is defined by a logical grouping of disk drives by the RAID controller and is identified within the RAID subsystem by a unique logical unit number (LUN). The RAID controller shares its large cache memory among all the LUNs that it controls. Higher performance RAID controllers utilize the cache memory with a write-back technique in which the host computer requesting the write operation is permitted to continue as soon as the requested write data is entered into the cache memory of the RAID controller. A background operation within the RAID controller eventually posts the cached write data (dirty data) on the disk drives to which it was originally destined.

Posting the cached data to the disk drives is often done by a read-modify-write (RMW) method wherein the new data blocks to be posted are used in conjunction with related old blocks on the disk drives to compute the new error checking information associated with the new data blocks. The related old blocks are read from the disk drives in order to compute the new error checking information. A second posting method, called the full write method (also referred to herein as a stripe write method or simply a stripe write), writes new data blocks and associated new error checking blocks without reading the old data or associated old error checking blocks from the disk drives. Rather, all data blocks which comprise a stripe on the RAID device are known to be resident in the cache memory, a new error checking block is computed therefrom by the RAID controller, and the new data blocks plus computed error checking block are written to the disk drives. The first method, the RMW method, functions properly regardless of the other information resident in the cache memory, but requires computation of the new error checking block. The second method, the stripe write method, uses only the new data blocks already resident in the cache memory to compute the associated new error checking block.

Error checking blocks often use simple parity information computed by boolean exclusive or (XOR) operations performed by the RAID controller upon the data blocks of a stripe. However, lower cost RAID controllers may be built if the general purpose computational power of performing XOR operations may be excluded from the design of the RAID controller. A relatively recent development provides for removing the XOR computational functions from the RAID controller by adding XOR operation related commands to the disk drives themselves. These XOR operations on disk drives are referred to as the XOR command set. Disk drives having this XOR command set capability are referred to herein as XOR command set enabled or simply XOR enabled disk drives. The preliminary specification entitled "XOR Commands on SCSI Disk Drives" discusses the XOR command set standard defined for implementation within the disk drives used in a RAID subsystem. XOR commands are defined which include the xdwrite command to cause a XOR enabled disk drive to read the corresponding old data, XOR the old data with the controller supplied new data, write the new data in place of the old data, and send the result of the XOR operation to the parity disk drive for update of the parity information. This sequence of steps is automatically performed by the XOR enabled drives which all reside on a common bus (e.g. on a common SCSI bus) by virtue of receipt of the single XOR xdwrite command from the RAID controller.

Embedding the XOR computational functions within the disk drive electronics enables lower cost RAID controllers to maintain high levels of performance by shifting the functions required for parity computation onto the disk drive electronics. In addition, the XOR command set reduces the number of I/O operations required between the RAID controller and the RAID device to perform a single stripe write operation. The XOR command set has been submitted for approval as American National Standards Institute (ANSI) specification X3T10/94-111r8 and is therefore readily available to those of ordinary skill in the art.

As applied to a stripe write operation the XOR command set specification suggests that an entire stripe may be written by sequentially issuing xdwrite command to each of the data disk drives in the stripe. This technique serves to reduce the total number of I/O operations between the RAID controller and the disk drives by one (the write of the parity disk is impliedly performed by each of the xdwrite operations). However, the method reduces overall performance of the subsystem because each of the xdwrite commands must be issued sequentially (at least, each must await the availability of the parity disk to re-write the parity information). In addition, the xdwrite operations impliedly read the old data from the location to be written which may add latency delays awaiting the rotation of the disk drive in order to write the new data after the read of the old data.

It therefore remains a problem to further reduce the number of I/O operations required between the RAID controller and the RAID device and to reduce the delay time caused by disk drive latency awaiting rotational delays of the disk drives. It is therefore evident from the above discussion that a need exists for reducing the number of I/O operations and improving the overall performance of RAID stripe write operations which utilize disk drives having the XOR command set implemented therein.

SUMMARY OF THE INVENTION

The present invention solves the above and other problems, thereby advancing the state of the useful arts, by providing methods for utilizing disk drives having the XOR command set for stripe write operation in a manner that reduces the number of I/O operations as compared to prior designs and improves the overall performance of the RAID subsystem. In particular, the methods of the present invention utilize parallel, standard write operations on the data drives of the stripe, followed by the XOR rebuild operation issued to the parity disk drive of the RAID device.

The XOR command set specification suggests that a stripe write operation would be performed by the RAID controller issuing an xdwrite operation to each of the data disk drives in the stripe. Each xdwrite operation causes the XOR enabled, data disk drive to which the command is directed to first read the old data from the location to be overwritten. The old data so read and the new data supplied by the RAID controller are XOR'd by the XOR enabled disk drive to generate a net XOR result held within a buffer of the XOR enabled disk drive. The new data is then written to the disk drive while the net XOR result is sent with an xpwrite XOR command to the parity disk drive (also XOR enabled and on the same bus—e.g. on the same SCSI bus). The parity disk then XOR's the supplied net XOR result with the old parity information read from the parity disk drive. The resultant new parity is then written back to the parity disk. This process, initiated by the single xdwrite issued from the RAID controller to one of the XOR enabled data disk drives, is then repeated for each of the remaining data disk drives.

In this prior approach suggested by the ANSI XOR command set specification, the best case delay caused by disk drive latency, as measured in units of one disk drive rotational latency, is approximately equal to the number of data disk drives in the stripe. This best case assumes the maximum possible overlap of the rotational latencies among the several disk drives. The best case assumes that each xpwrite operation issued to the parity drive will require one full latency before the next xpwrite operation may complete. Since each data disk drive performs an xdwrite operation at the RAID controller's direction there will be a corresponding number of xpwrite commands performed by the parity disk drive.

A stripe write performed in accordance with the method of the present invention has a worst case latency delay of two rotational latencies. First, all data drives in the stripe are provided with a standard write request to overwrite the old data with the new data blocks. Since the data drive write commands are issued in parallel with one another, the total worst case rotational latency for completion of all data drive write commands is one latency. Next, a rebuild XOR command is issued by the RAID controller to the parity drive. Responsive to the rebuild command, the parity drive reads each of the data drives to retrieve the corresponding data portions of the stripe, XOR's the retrieved data portions, and writes the resultant new parity onto the parity drive. Since the data drives were just written, it is reasonable to assume that the new data still resides in the buffers associated with each of the XOR enabled data disk drives. Reading the data portions of the stripe from the buffers of each of the data drives is an extremely fast operation in comparison with the rotational latency delays of disk drives. The rebuild operation issued to the parity disk drive may therefore read all required data drives, compute the new parity blocks using XOR logic in the XOR enabled parity disk drive, and write the new parity onto the parity disk drive all within a single rotational latency delay.

The methods of the present invention therefore permit stripe write operations to be performed on XOR command set enabled disk drives with a worst case delay of two rotational latencies. This enables lower cost RAID controllers (without XOR computation capabilities) to provide performance similar to higher cost RAID controllers (with XOR parity computational capabilities). The term RAID controller as utilized herein therefore refers to controllers embedded within a RAID subsystem as well as simpler RAID control methods operable within a disk adapter interface of a computer system. More generally, the methods of the present invention are operable within any device intended to control the operation of a RAID subsystem.

It is therefore an object of the present invention to provide improved methods for performing stripe writes on RAID devices.

It is a further object of the present invention to provide improved methods for performing stripe writes on RAID devices having XOR command set enabled disk drives.

It is further an object of the present invention to provide methods for performing stripe writes on RAID devices having XOR command set enabled disk drive by using the XOR rebuild command.

It is still another object of the present invention to provide methods for performing stripe writes on RAID devices having XOR command set enabled disk drives with at most two rotational latency delays.

The above and other objects, aspects, features, and advantages of the present invention will become apparent from the following description and the attached drawing.

DETAILED DESCRIPTION OF THE INVENTION

Figure 1:
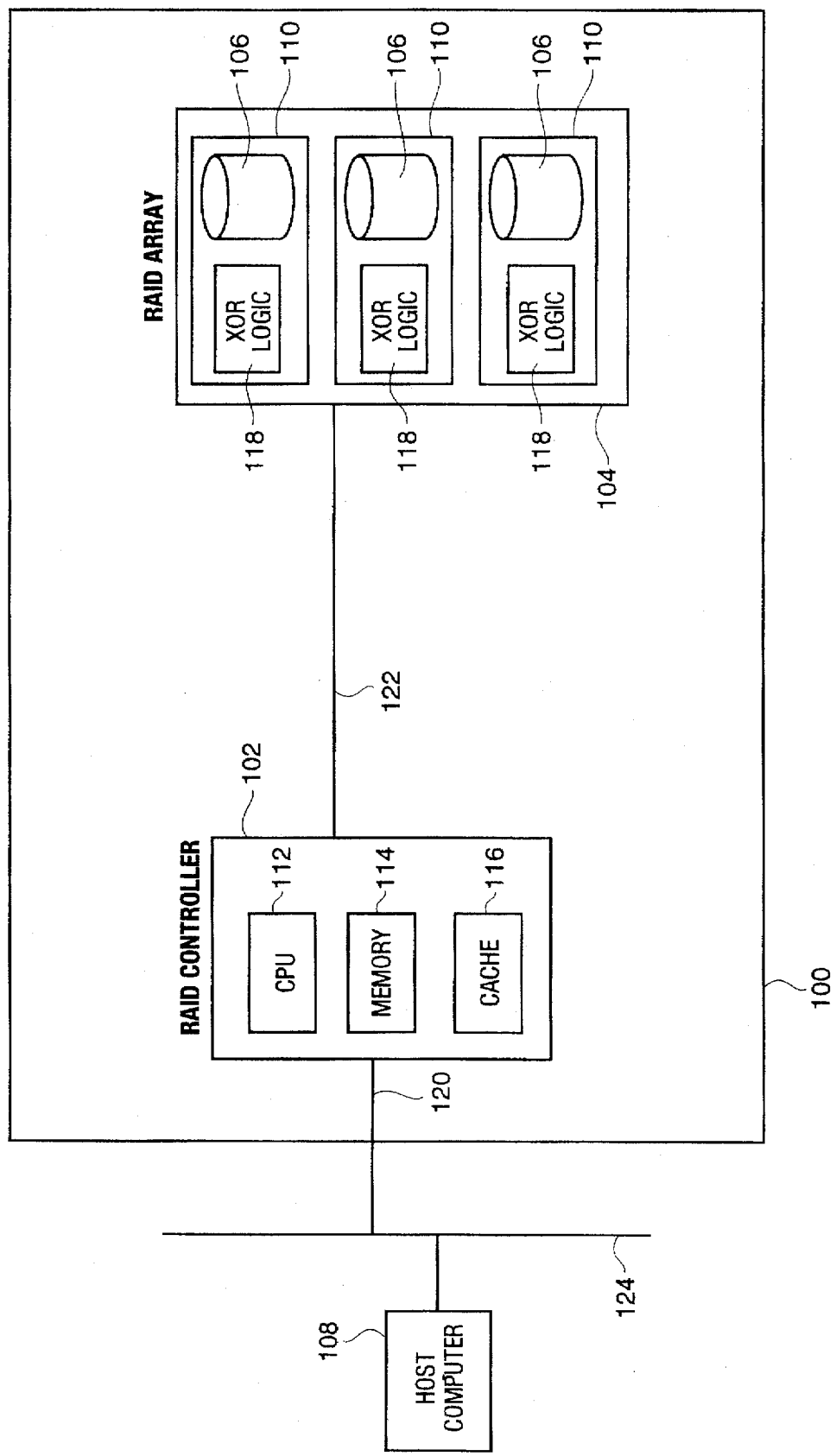
FIG. 1 is a block diagram depicting a typical RAID storage subsystem in which the methods of the present invention may be advantageously applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 depicts a RAID storage subsystem 100 operable in accordance with the methods and structures of the present invention. RAID controller 102 is connected to one (or more) host computer systems 108 via bus 124 and interface 120. As is known to those of ordinary skill in the art, bus 124 may comply with any of several interface standards including: fiber channel, SCSI, Ethernet, etc. Interface 120 adapts RAID controller 102 to communicate with attached host computer(s) 108 via the standard bus 124. SCSI or local area network (LAN) attachments to host computer systems 108 are common for RAID storage subsystems.

RAID controller 102 is connected to disk drives 110 of group 104 (a logical grouping of the array of disk drives 110 used for storage and redundancy control of the information stored in the RAID subsystem 100). Interface bus 122 connecting RAID controller 102 and disk drives 110 of group 104 may be any of several well known interface busses for connection of disk drives, including: SCSI, IDE, EIDE, IPI, Fiber Channel, etc. Group 104 is also referred to herein as a RAID device or disk array. Group 104 is typically configurable by RAID controller 102 to store and retrieve information (data and redundancy or error checking information) according to any of the several RAID storage standards including so called RAID levels 0–5.

RAID controller 102 is further comprised of CPU 112 in which the methods of the present invention operate, memory 114 wherein the programmed steps of the methods of the present invention and associated data are stored and retrieved, and cache 116 wherein data supplied by a host computer system 108 is written by CPU 112 in response to receipt of a host computer system 108 write request. The data so written to cache 116 is referred to as dirty data until such time as a background process operable within CPU 112 posts the dirty data to the disk drives 110 in the RAID device 104 to which the requesting host computer system 108 directed its write request. Once posted, the dirty data in cache 116 is available for re-use by CPU 112 to complete another write request from a host computer system 108. Such cache operations are often referred to as write-back caching and is well known to those of ordinary skill in the art.

Each of disk drives 110 in group 104 is attached to the common bus 122 for communication between one another and for communication with controller 102. Each of disk drives 110 is comprised of a standard disk drive component 106 and includes XOR logic component 118 which includes buffer memory and computational boolean logic for XOR'ing information. The standard drive component 106 and the XOR logic component of each disk drive 110 is shown separately only for purposes of clarity in the following discussions of the methods of the present invention. XOR command set enabled disk drives simply integrate the XOR command set logic and methods into their standard control and interface circuits as is known to those of ordinary skill in the art. XOR command set enabled disk drives 110, as used herein, refers to disk drives compatible with the ANSI specification X3T10/94-111r8.

PRIOR ART STRIPE WRITE TECHNIQUES

Figure 2:
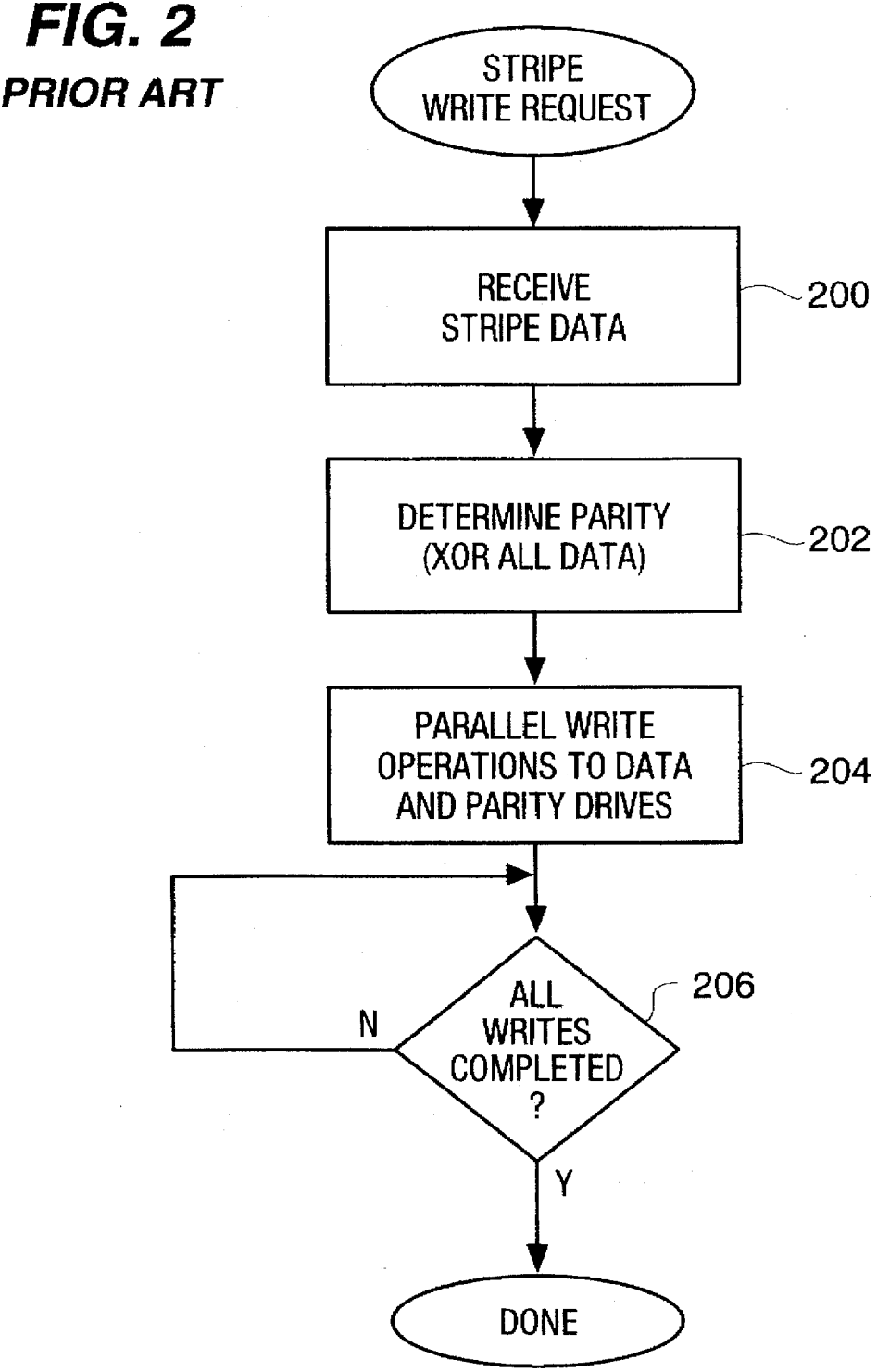
FIG. 2 is a flowchart describing the methods of prior designs for performing a stripe write without XOR command set enabled disk drives.
Figure 3:
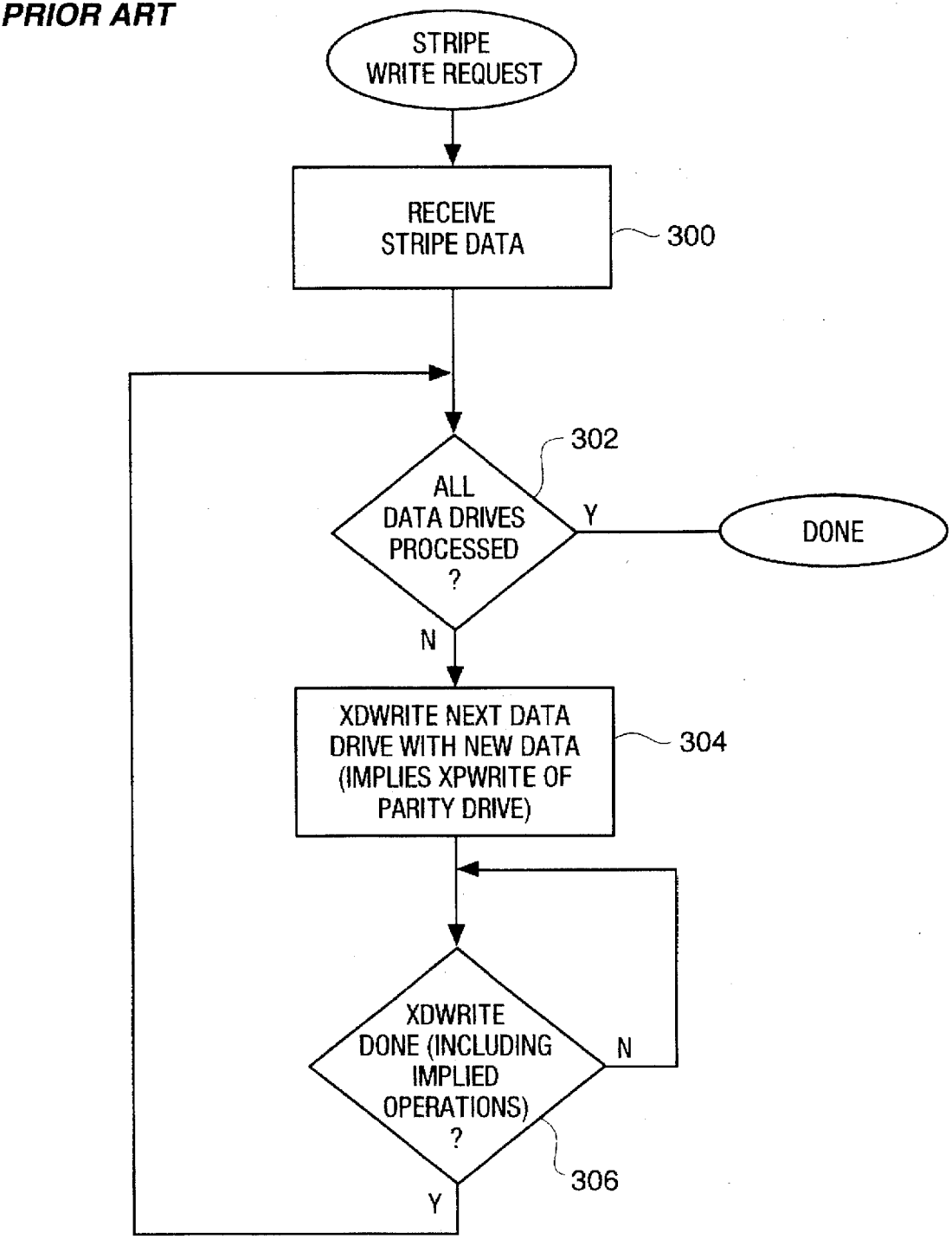
FIG. 3 is a flowchart describing the methods of prior designs for performing a stripe write with XOR command set enabled disk drives.

FIGS. 2 and 3 are flowcharts describing the stripe write operation implemented by a RAID controller in accordance with prior designs. FIG. 2 is a flowchart describing the operation of a stripe write performed by a RAID controller with XOR parity generation capabilities as is well known in the art. Element 200 of FIG. 2 is operable within the RAID controller in response to a stripe write requirement generated within the RAID controller to post dirty data from the cache memory to the disk drives of the RAID device. Element 200 receives the stripe data to be written (posted) to the disk array. Element 202 is then operable to determine the parity information associated with the stripe data. The parity information is computed with the RAID controller, in accord with prior techniques, by XOR'ing all the data blocks of the stripe to generate the parity block corresponding to the data blocks of the stripe.

Element 204 is then operable to issue write operations to all disk drives of the group to write the data blocks and the newly computed parity blocks to the stripe of the disk array. Element 206 is then operable to await completion of all write operations on all data and parity disk drives of the stripe. When element 206 determines that all disk drives have completed their write operations, the stripe write method of FIG. 2 (known in the prior designs) is completed.

The stripe write operation depicted in FIG. 2 is known in the art to be used in conjunction with RAID controllers having parity generation (XOR) capabilities. This method permits highly optimized operations by overlapping the writes of all disk drives in the stripe. This technique provides the highest performance known for a stripe write operation in a RAID subsystem. However, as noted above, the high performance stripe write operation of FIG. 2 requires the XOR generation functions to be present within the RAID disk controller. This requirement precludes designs for lower cost RAID controllers having less computational capabilities.

By using disk drives with local XOR generation and control logic compatible with the ANSI XOR command set specification, a simpler RAID controller (e.g. one without XOR generation capabilities) may be designed. FIG. 3 is a flowchart of a stripe write operation as may be performed by a simple RAID controller, known in the art, when used with XOR command set enabled disk drives. Element 300 of FIG. 3 is operable within the RAID controller in response to a stripe write requirement generated within the RAID controller to post dirty data from the cache memory to the disk drives of the RAID device. Element 300 receives the stripe data to be written (posted) to the disk array.

Elements 302–306 are then operable iteratively to process each section of the stripe data to be written to each of the data disk drives in the stripe. Element 302 determines whether additional data disk drives remain to be processed in the stripe to be written. If all data drives in the stripe have been processed by elements 302–306, then processing of the stripe write operation of FIG. 3 is completed. Otherwise, elements 304 and 306 are next operable to process the next data disk drive in the stripe write operation.

Element 304 is operable within the RAID controller known in prior designs to issue an xdwrite XOR command to the next data disk drive associated with the stripe to be written. As is known according to the ANSI XOR command set specification, the xdwrite command issued to an XOR command set enabled data disk drive implies a read of the corresponding old data to be overwritten and an xpwrite XOR command issued by the data disk drive directly to the parity disk drive over their common attachment interface bus. The old data read by the data disk drive is XOR'd with the new data supplied by the RAID controller in the xdwrite command to produce a net XOR result in a buffer of the data disk drive. This net XOR result is then transmitted to the parity disk drive along with the xpwrite XOR command. The parity disk drive reads its old parity data from the corresponding parity blocks to be overwritten and XOR'S the old parity data with the net XOR result received from the data disk drive along with the xpwrite XOR command to generate new parity blocks. The newly generated parity blocks are then written by the parity disk drive over its old parity blocks.

Element 306 is then operable to await the completion of the xdwrite operation to the data disk drive—inclusive of the wait required for completion of the implied reading of the data disk drives and the implied xpwrite operations on the parity disk drive). When element 306 determines that the xdwrite operation has completed on the data disk drive, processing continues by looping back to element 302 to process the next data disk drive in the stripe write operation.

As noted above, this method of using the XOR command set is known in the art to reduce (by one) the number of I/O operations generated by the RAID controller to the disk array. More importantly, this method uses the XOR command set enabled disk drives to eliminate the requirement within the RAID controller for computational capabilities to generate the parity information (XOR generation capabilities). Eliminating this requirement reduces the complexity of a compliant RAID controller to thereby permit the design of lower cost RAID controllers.

However, as noted above, this reduction of complexity results in a significant increase in disk array delays (reduction in performance of the RAID device) by adding significantly to the delays imposed on the stripe write operation due to rotational latency of the disk drives. In particular, the best case latency delay required by the method of FIG. 3 is approximately equal to the number of data disk drives in the stripe. Each data disk drive processed by the method of FIG. 3 generates an xpwrite XOR command to the parity disk drive of the stripe. Even assuming the best possible overlap (parallelization) of the xdwrite operations (and the implied read operations) on the data disk drives, the entire stripe write operation is limited to the speed of xpwrite XOR operations on the parity disk drive of the stripe write operation. Each xdwrite operation on a data disk drive generates an xpwrite for the same blocks of parity information on the associated parity disk of the stripe. Since each xpwrite must await completion of the previous xpwrite, the entire stripe write operation cannot complete until the last xpwrite operation on the parity disk drive is completed. Thus, the stripe write operation is delayed at least one rotational latency time period for each data disk drive in the stripe.

PRESENT INVENTION STRIPE WRITE METHOD OPERATION

Figure 4:
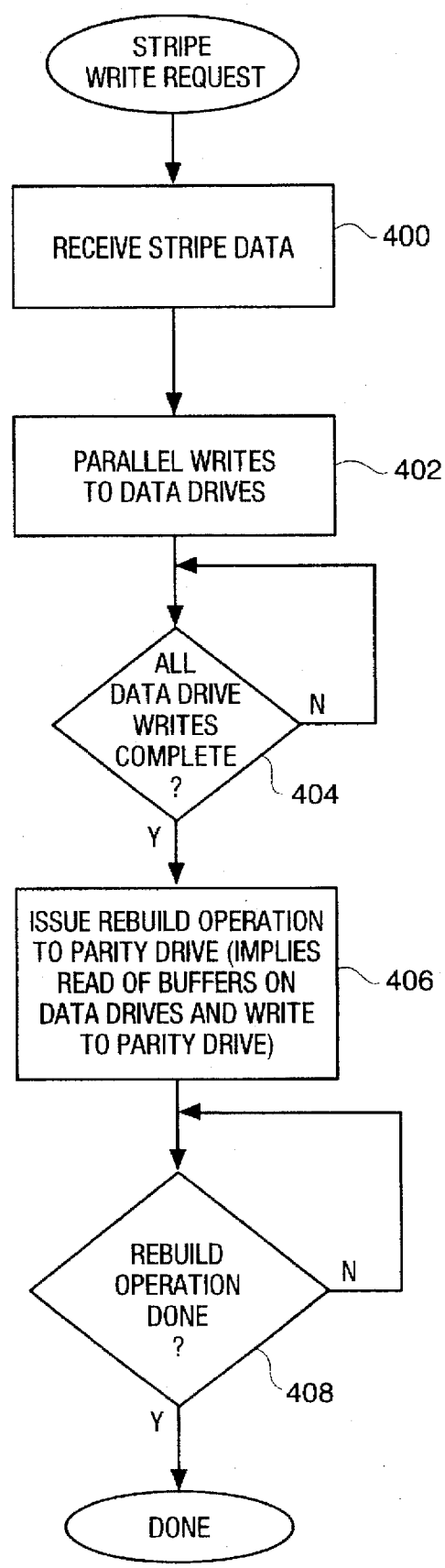
FIG. 4 is a flowchart describing the methods of the present invention for performing a stripe write with XOR command set enabled disk drive.

FIG. 4 is a flowchart describing the operation of the improved methods of the present invention for performing a stripe write operation on a RAID device having XOR command set enabled disk drives. Element 400 of FIG. 4 is operable within the RAID controller 102 of FIG. 1 in response to a stripe write requirement generated within the RAID controller 102 to post dirty data from the cache memory 116 to the disk drives 110 of the RAID device 104. Element 400 receives the stripe data to be written (posted) to the disk array. As in FIG. 3, there is no requirement in the improved method of FIG. 4 to generate the parity information by performing an XOR operation over all the blocks of new data. In this sense, the improved method of the present invention of FIG. 4 is analogous to that of FIG. 3 and represents an improvement over the prior methods depicted in FIG. 2 wherein the RAID controller must compute the parity information.

Element 402 is next operable to initiate parallel write operations to all data disk drives 110 of the RAID device 104. Unlike the method of FIG. 3, all data disk drives are written in parallel using standard write commands rather than the xdwrite XOR command shown in FIG. 3. Element 404 is then operable to await completion of the parallel write commands to the data disk drives of the disk array 104. When all write operations issued by the RAID controller 102 to the disk array 104 have completed, processing continues at element 406.

Element 406 is then operable in response to completion of the parallel write operations to the data disk drives 110 of disk array 104 to initiate a rebuild XOR operation on the parity disk drive 110 for the blocks corresponding to the stripe write request. The rebuild XOR command is specified by the ANSI XOR command set specification to read the corresponding blocks from every other disk drive in the disk array (the blocks corresponding to the stripe write request on each other disk drive—i.e. the data disk drives 110). The blocks so read from the other disk drives 110 in the disk array 104 are XOR'd by the XOR logic 118 of the parity disk drive 110 to generate the new parity information. The newly generated parity information is then written to the parity disk drive to update the parity for the stripe write operation. Element 408 is then operable to await completion of the rebuild XOR command to the parity disk drive 110 at which time the stripe write operation, performed in accordance with the methods of the present invention, is complete.

As noted above, the method of the present invention improves upon the prior methods as depicted and described above with respect to FIG. 2 in that the RAID controller need not embody the parity (XOR) generation computational elements and may therefore be simplified by comparison to prior RAID controller designs. In addition, the methods of the present invention improves upon the prior methods as depicted and described above with respect to FIG. 3 in that the methods of the present invention require less delay due to rotational latency as compared to prior methods utilizing the XOR command set. In particular, the worst case rotational latency delay in performing a stripe write operation in accordance with the present invention methods is two latency time periods. At most one latency period may be required to await the completion of the parallel data disk drive write operations initiated by element 402 of FIG. 4. Additionally, at most one rotational latency time period may be required to await the completion of the rebuild operation initiated by operation of element 406. Although the rebuild XOR command issued to the parity disk drive 110 by operation of element 406 requires the reading of each of the other disk drives 110 in the stripe, the data to be read was written to the data disk drives immediately preceding the read request impliedly generated by operation of the rebuild XOR command. Therefore, the data to be read by operation of the rebuild XOR command is readily available from the buffer within the XOR logic 118 of each data disk drive 110. The rebuild XOR operation may therefore be completed within, at worst, one rotational latency period of the parity disk drive—the maximum time period required to complete the rebuild XOR commands write of the parity disk drive 110.

COMPARATIVE PERFORMANCE

The methods of the present invention improve upon the performance of presently known stripe write methods utilizing the XOR command set as presented and discussed above with respect to FIG. 3. Table 1 below presents an analysis for average performance for each of three methods: namely, method 1 as depicted above in FIG. 2 for prior methods performing stripe writes on high performance RAID controllers; method 2 as depicted above in FIG. 3 for prior methods performing stripe writes on simpler RAID controller using the XOR command set of the disk drives; and method 3 (the method of the present invention) as depicted above in FIG. 4 for performing stripe writes on simpler RAID controllers using the XOR command set of the disk drives while improving stripe write performance as compared to the method of FIG. 3. The performance as presented below in Table 1 is expressed in terms of mechanical delays including seeks and rotational latency. In the table below, the symbol "SK" stands for the average seek time delay required for performing a seek on a disk drive (i.e. approximately half of a full seek) and the symbol "RL" stands for the worst case rotational latency of a disk drive (i.e. a full rotation). The performance of the various methods is depicted as the total of the seeks and rotational latencies required for each method operating to perform a stripe write. The symbol "N" is the number of data disk drives involved in a stripe write. The number of parity disks involved in each stripe is presumed to be one.

TABLE 1

| Method | First Data Write | Subsequent Data Writes | Parity Write (XOR Rebuild) | Total |
|---|---|---|---|---|
| 1 | (N/(N + 1)) × (SK + RL) | n/a | n/a | (N/(N + 1)) × (SK + RL) |
| 2 | 2×SK + 2×RL | (N−2) × ((SK + (2.5×RL)) | n/a | 2×SK + 2×RL + (N−2) × (SK + (2.5×RL)) |
| 3 | ((N−1)/N) × (SK + RL) | n/a | (SK + .5×RL) | ((N−1)/N) × (SK + RL)) + (SK + .5×RL) |

One of ordinary skill in the art will recognize that methods 1 and 3 perform writes in parallel and that therefore there are no subsequent data writes. In addition, the estimated performance for the first data write using the known XOR stripe write technique (method 2) presumes some overlap in the rotational latencies incurred by operation of the first data disk and the parity disk. The information in the above Table 1 is intended only as exemplary of typical subsystem performance using each of the two prior methods (1 and 2 above) and the improved method of the present invention (method 3 above).

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a RAID controller for controlling a RAID storage subsystem having at least one disk array comprising a plurality of XOR command set enabled disk drives, a method operable within said RAID controller for performing a stripe write of data to said disk array, said method comprising the steps of:
   initiating write operations to all disk drives which contain data in the stripe to be written; and
   initiating, responsive to completion of said write operations, an XOR command set rebuild command to the disk drive containing parity information in the stripe.

2. The method of claim 1 wherein said write operations are performed in parallel.

3. In a RAID subsystem having a disk array comprising a plurality of data disk drives and at least one XOR command set enabled parity disk drive, a method operable within a RAID controller for performing a write of data to said disk array, said method comprising the steps of:
   initiating write operations to a subset of said data disk drives; and
   initiating an XOR command set rebuild command to said at least one XOR command set enabled parity disk drive.

4. The method of claim 3 wherein said write operations are performed in parallel.

5. The method of claim 3 wherein the step of initiating a rebuild is responsive to completion of the write operations.

6. The method of claim 3 wherein said subset is all of said plurality of data disk drives.

7. A RAID controller for controlling a RAID subsystem having a disk array comprising a plurality of data disk drives and at least one XOR command set enabled parity disk drive, said RAID controller comprising:

means for initiating write operations to a subset of said data disk drives; and means, responsive to said means for initiating write operations, for initiating an XOR command set rebuild command to said at least one XOR command set enabled parity disk drive.

8. The RAID controller of claim 7 wherein said write operations are performed in parallel.

9. The RAID controller of claim 7 wherein said subset is all of said plurality of data disk drives.

* * * * *